United States Patent
King et al.

(10) Patent No.: US 9,073,448 B2
(45) Date of Patent: Jul. 7, 2015

(54) METHOD OF OPERATING PROPULSION SYSTEM

(75) Inventors: Robert Dean King, Schenectady, NY (US); Ajith Kuttannair Kumar, Erie, PA (US); Lembit Salasoo, Schenectady, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 2505 days.

(21) Appl. No.: 11/745,191

(22) Filed: May 7, 2007

(65) Prior Publication Data

US 2008/0281479 A1 Nov. 13, 2008

(51) Int. Cl.
| | |
|---|---|
| B60K 1/00 | (2006.01) |
| F02D 41/00 | (2006.01) |
| B60L 15/20 | (2006.01) |
| B60L 11/12 | (2006.01) |
| B60L 11/18 | (2006.01) |
| B60K 6/26 | (2007.10) |
| B60K 6/28 | (2007.10) |

(Continued)

(52) U.S. Cl.
CPC . *B60L 15/20* (2013.01); *B60K 6/26* (2013.01); *B60K 6/28* (2013.01); *B60L 11/123* (2013.01); *B60L 11/1868* (2013.01); *B60L 2210/20* (2013.01); *B60L 2240/16* (2013.01); *B60W 10/06* (2013.01); *B60W 10/08* (2013.01); *B60W 20/00* (2013.01); *B60W 30/18127* (2013.01); *Y02T 10/6217* (2013.01); *Y02T 10/6286* (2013.01); *Y02T 10/7005* (2013.01); *Y02T 10/7066* (2013.01); *Y02T 10/7077* (2013.01); *Y02T 10/725* (2013.01); *B60L 2200/26* (2013.01); *Y02T 10/7275* (2013.01)

(58) Field of Classification Search
USPC ....... 701/22; 290/40 C, 40 A; 180/65.2, 65.3, 180/65.4, 65.5, 65.21, 65.31, 65.51, 69.6
See application file for complete search history.

(56) References Cited

U.S. PATENT DOCUMENTS

| | | |
|---|---|---|
| 4,203,058 A | 5/1980 | Chen |
| 4,339,704 A | 7/1982 | McSparran et al. |

(Continued)

FOREIGN PATENT DOCUMENTS

| | | |
|---|---|---|
| EP | 0775607 A1 | 5/1997 |
| EP | 1518735 A1 | 3/2005 |

(Continued)

OTHER PUBLICATIONS

PCT International Search Report dated Jan. 15, 2010.

(Continued)

*Primary Examiner* — Ronnie Mancho
(74) *Attorney, Agent, or Firm* — Fletcher Yoder, P.C.

(57) ABSTRACT

A method is provided that includes propelling an electrically driven vehicle at a first, slower speed, and potentially high torque by supplying electricity at a first, lower voltage from an energy storage device to a second electric motor; and includes propelling the vehicle at a second, faster speed, and moderate torque by supplying electricity at a second, higher voltage from an engine-driven generator to a first electric motor. Another method includes propelling an electrically driven vehicle by supplying electricity from an engine-driven generator to a first electric motor; and generating electricity at a second electric motor to charge an energy storage device. Corresponding systems for implementing the method are provided.

22 Claims, 3 Drawing Sheets

(51) Int. Cl.
*B60W 10/06* (2006.01)
*B60W 10/08* (2006.01)
*B60W 20/00* (2006.01)
*B60W 30/18* (2012.01)

(56) References Cited

U.S. PATENT DOCUMENTS

| | | | |
|---|---|---|---|
| 6,005,788 | A | 12/1999 | Lipo et al. |
| 6,209,672 | B1 | 4/2001 | Severinsky |
| 6,232,435 | B1 | 5/2001 | Heitz |
| 6,257,680 | B1 | 7/2001 | Jacob |
| 6,316,842 | B1 | 11/2001 | Kuroda et al. |
| 6,591,758 | B2 | 7/2003 | Kumar |
| 6,612,246 | B2 | 9/2003 | Kumar |
| 6,615,118 | B2 | 9/2003 | Kumar |
| 6,672,415 | B1 * | 1/2004 | Tabata ............ 180/65.25 |
| 6,758,536 | B2 | 7/2004 | Jacob |
| 6,863,140 | B2 | 3/2005 | Noreikat et al. |
| 6,882,129 | B2 | 4/2005 | Boskovitch et al. |
| 6,909,200 | B2 | 6/2005 | Bouchon |
| 6,981,182 | B2 | 12/2005 | Roddy et al. |
| 6,984,946 | B2 | 1/2006 | Donnelly et al. |
| 7,078,877 | B2 | 7/2006 | Salasoo et al. |
| 7,104,347 | B2 | 9/2006 | Severinsky et al. |
| 7,104,921 | B2 | 9/2006 | Shimizu |
| 7,137,344 | B2 | 11/2006 | Kumar et al. |
| 7,147,071 | B2 | 12/2006 | Gering et al. |
| 7,185,591 | B2 | 3/2007 | Kumar et al. |
| 7,190,133 | B2 | 3/2007 | King et al. |
| 2001/0048226 | A1 * | 12/2001 | Nada ............... 290/40 C |
| 2002/0174796 | A1 | 11/2002 | Kumar et al. |
| 2002/0174797 | A1 | 11/2002 | Kumar |
| 2002/0174798 | A1 | 11/2002 | Kumar |
| 2003/0116367 | A1 * | 6/2003 | Kanno ............... 180/65.1 |
| 2003/0151387 | A1 | 8/2003 | Kumar |
| 2003/0205422 | A1 | 11/2003 | Morrow et al. |
| 2003/0233959 | A1 | 12/2003 | Kumar |
| 2004/0099887 | A1 | 5/2004 | Hazelton |
| 2004/0174125 | A1 | 9/2004 | Wilton et al. |
| 2004/0245410 | A1 | 12/2004 | Kisak et al. |
| 2005/0024001 | A1 | 2/2005 | Donnelly et al. |
| 2005/0139399 | A1 | 6/2005 | Gopal |
| 2005/0204949 | A1 | 9/2005 | Jacob |
| 2005/0206331 | A1 | 9/2005 | Donnelly |
| 2005/0209747 | A1 | 9/2005 | Yakes et al. |
| 2005/0269995 | A1 | 12/2005 | Donnelly et al. |
| 2006/0001399 | A1 | 1/2006 | Salasoo et al. |
| 2006/0005736 | A1 | 1/2006 | Kumar |
| 2006/0005738 | A1 | 1/2006 | Kumar |
| 2006/0005739 | A1 | 1/2006 | Kumar |
| 2006/0012320 | A1 | 1/2006 | Kumar |
| 2006/0061307 | A1 | 3/2006 | Donnelly |
| 2006/0076171 | A1 * | 4/2006 | Donnelly et al. ............ 180/65.2 |
| 2006/0196712 | A1 * | 9/2006 | Toyota et al. ............... 180/165 |
| 2006/0214626 | A1 | 9/2006 | Nilson et al. |
| 2006/0266256 | A1 | 11/2006 | Donnelly et al. |
| 2006/0272863 | A1 | 12/2006 | Donahue |
| 2006/0283350 | A1 | 12/2006 | Kumar et al. |
| 2006/0284601 | A1 | 12/2006 | Salasoo et al. |
| 2009/0160247 | A1 * | 6/2009 | Nakamura et al. ............ 307/9.1 |

FOREIGN PATENT DOCUMENTS

| | | |
|---|---|---|
| EP | 1518736 A1 | 3/2005 |
| JP | 2005206058 A | 8/2005 |
| WO | WO2006138130 A2 | 12/2006 |

OTHER PUBLICATIONS

PCT Internal Search Report dated Feb. 26, 2010.
CN Office Action dated Jun. 4, 2014, CPME1245292D.
CN Search Report mailed Dec. 25, 2014, CPME 1343204D.

* cited by examiner

METHOD OF OPERATING PROPULSION SYSTEM

BACKGROUND

1. Technical Field

The invention includes embodiments that relate to a propulsion system. The invention includes embodiments that relate to method of using the propulsion system.

2. Discussion of Art

Some vehicles use electric traction motors to propel the vehicle. These electric traction motors may be connected to an electrical coupling structure referred to as a link that provides the motors with power. Such links may be an electrical bus system. One or more alternators on-board the vehicle may be used to provide the power to the link. In certain operating conditions, such as when the vehicle is decelerating or is maintaining speed on a downhill grade, the back-electromotive force (EMF) produced by the electric motors is greater than the voltage provided by the engine-driven alternator. Under such conditions, the electric traction motors cease acting as motors and become generators. This process, known as dynamic braking, is a form of electric braking that is used to reduce wear on the mechanical brake system components of a vehicle. In the case where the vehicle is a locomotive, dynamic braking reduces brake wear on the locomotive and also all of the rail cars of the train. During dynamic braking, one or more resistors dissipate the electric power as heat. In the case where the vehicle is a truck or other medium or heavy duty vehicle using electric drive propulsion, dynamic braking can be used to reduce wear on the mechanical brake system components associated with each individual wheel.

Hybrid propulsion systems have been developed to recover some of the energy that would otherwise be wasted as heat during dynamic braking. The recovery of this otherwise-wasted energy is regenerative braking. Hybrid propulsion systems can use two different energy sources: a heat engine and an energy storage unit. The heat engine may burn fuel to produce mechanical work—an internal combustion engine, a turbine engine, and a diesel engine are examples. The energy storage unit may include an electrically re-chargeable battery, an ultracapacitor, or a flywheel having a high power density.

Conventionally, a hybrid propulsion system includes an on-board heat engine coupled to an alternator that converts the mechanical output power of the engine into an alternating current (AC) electrical power. A rectifier converts the AC output of the alternator into a direct current (DC). A portion of the DC output of the rectifier may charge an energy storage unit, and a remaining DC output portion drives an electrical motor, which in turn propels the vehicle.

During vehicle acceleration, the energy storage unit may discharge to augment electrical power output of the engine-alternator, and may provide boosted power levels for a period of time. During vehicle braking, the energy storage unit recharges to regeneratively capture a portion of the energy otherwise-wasted during braking.

Heavy duty hybrid propulsion systems may require massive energy storage devices. Due to the simultaneous power and energy requirements, conventional heavy duty hybrid propulsion system may need parallel operation of many smaller energy storage units that are normally configured as several parallel strings of a large number of series-connected cells. Power sharing within the parallel energy storage units may be problematic.

It may be desirable to have a propulsion system with properties and characteristics that differ from those properties and characteristics of currently available propulsion systems. It may be desirable to have a propulsion system that implements a method that differs from those methods currently available.

BRIEF DESCRIPTION

In one embodiment, a method includes propelling an electrically driven vehicle at a first, slower speed, and potentially high torque by supplying electricity at a first, lower voltage from an energy storage device to a second electric motor; and includes propelling the vehicle at a second, faster speed, and moderate torque by supplying electricity at a second, higher voltage from an engine-driven generator to a first electric motor. In one aspect, the first motor and the second motor are not in electrical communication with each other.

In one embodiment, a method includes propelling an electrically driven vehicle by supplying electricity from an engine-driven generator to a first electric motor; and generating electricity at a second electric motor to charge an energy storage device. In one aspect, the method may further include applying a torque command to the first electric motor that is opposite polarity to a torque command supplied to the second electric motor.

In one embodiment, a method includes monitoring for component failure in a first traction drive system in a vehicle having a plurality of traction drive systems, wherein the first traction drive system comprises a first electric motor coupled to a first energy storage device; and responding to a component failure indication of the first traction drive system. The response may include either routing energy to and from the first electric motor to a second energy storage device, or routing energy to and from the first energy storage device to a second electric motor. The routing decision may be based on which is the failed component.

Corresponding systems for implementing the methods are also provided.

DETAILED DESCRIPTION

Figure 1:
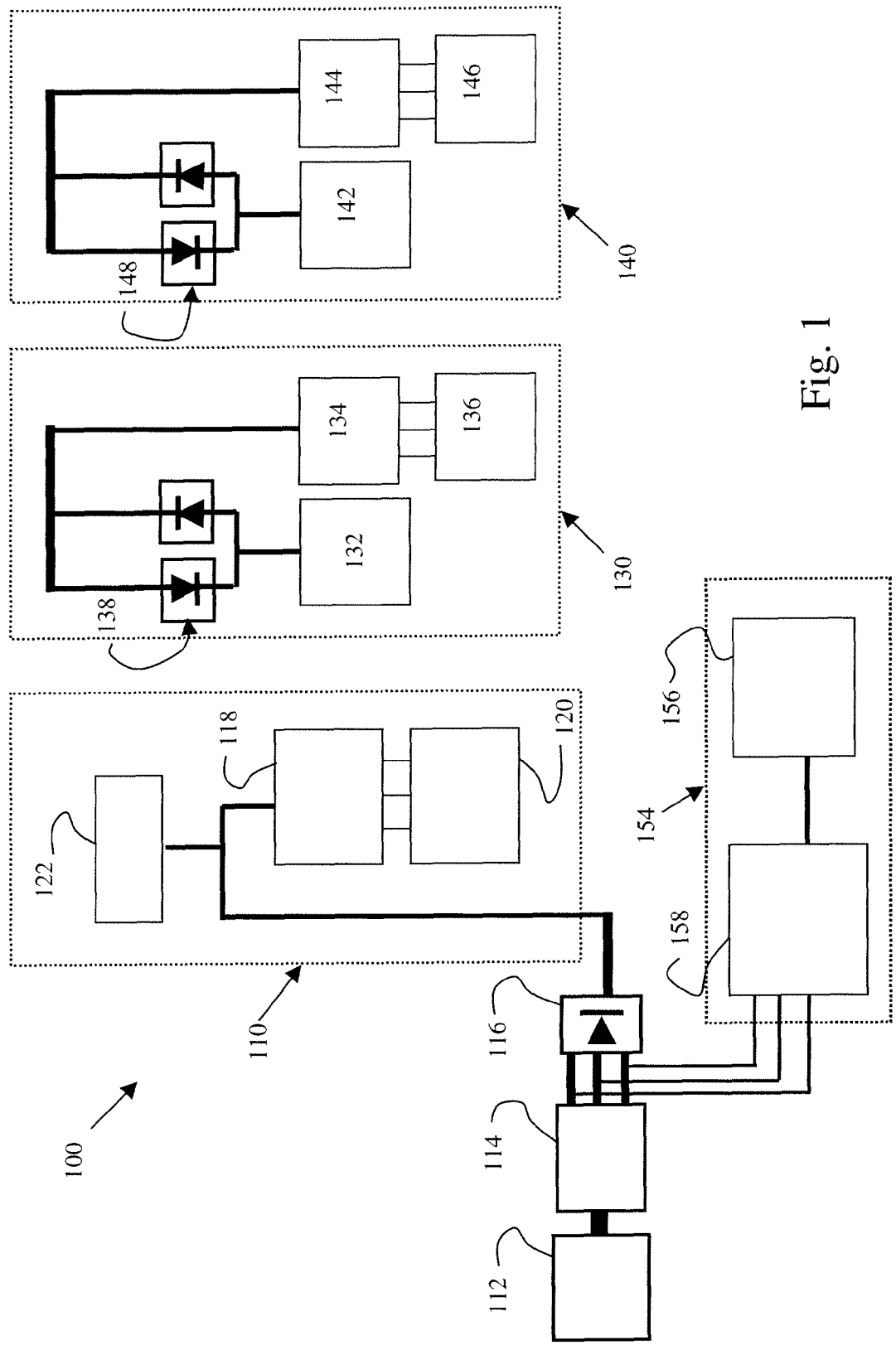
FIG. 1 is a schematic representation of a vehicle comprising an embodiment according to the invention.

The invention includes embodiments that relate to a method of using a propulsion system. The invention includes embodiments that relate to a system for implement the method. As used herein, voltage refers to direct current (DC) voltage unless context or language indicates otherwise. A prime mover includes an engine and an electrical generator, e.g. a diesel engine/alternator combination.

In one embodiment, the invention provides a distributed energy storage system, method, and apparatus for use in a hybrid propulsion system. The system includes a plurality of energy storage devices. Each of the energy storage device units selectively connects to a DC Link input of a traction drive. A prime mover supplies electrical power to a sub-set of the total multiple traction drives while the remaining traction drives are electrically powered via one or more energy storage devices. The plurality of energy storage devices includes at least an energy battery, and optionally one or more power batteries, ultracapacitors, or other energy batteries. Suitable energy batteries include a high temperature battery. During periods of high power braking events, where a traction drive torque command is in the opposite polarity as required for traction drive operation in a motoring mode, a portion of the regenerative braking energy may be captured in the energy storage units, while a connect/disconnect system decouples at least one energy storage unit from the first traction drive(s). The connect/disconnect system reconnects the energy storage device to a main DC Link to allow dynamic brake grids to dissipate the energy in a conventional manner from all of the multiple traction drives as needed.

During periods of extended high motive power operation when the energy stored in the energy storage unit is sufficiently depleted, a power control apparatus may allow power from the prime mover to be used in the propulsion drives that were initially powered from the plurality of energy storage units.

The distributed energy storage system in one embodiment reduces the need to put into parallel massive high voltage energy storage units. The propulsion system, including the power control apparatus may reduce or eliminate the need for an additional high power DC/DC converter to couple the energy storage unit and the DC Link in a multiple traction drive application. In addition, this hybrid concept using selected energy storage nominal voltage, allows efficient hybrid operation in both low-speed, high torque operation and high-speed, moderate torque operation.

High power regenerative braking energy can be captured in the energy storage system until a determined charge or voltage limit is attained. Then, the energy can be dissipated in a conventional dynamic brake grid as waste heat. Likewise, during extended periods of operation at high motive power when the energy storage unit depletes, the power control apparatus directs the prime mover to supply power using energy from the on-board fuel.

In one embodiment, a propulsion system for a vehicle is provided. The system may include a first traction drive system and a second traction drive system. The first traction drive system may include a heat engine and a first drive motor. The heat engine supplies energy to the first drive motor to propel the vehicle. The second traction drive system may include a second drive motor and a first energy storage device. The second drive motor may both supply energy to the first energy storage device and receive energy from the first energy storage device.

The vehicle may include one or more additional traction drive systems. In one embodiment, the vehicle has a third traction drive system. The third traction drive system may include a third drive motor and a second energy storage device. The third drive motor both supplies energy to the second energy storage device and receives energy from the second energy storage device. The third drive motor may supply the energy as electricity through a link device to the second energy storage device during a dynamic braking process. The first traction drive system further includes a dynamic brake resistor. Suitable dynamic brake resistors are commercially available.

At least one of the second traction drive system or the third traction drive system may be reversibly electrically decoupled from the first traction drive system. In one embodiment, the first drive motor electrically couples to only the first traction drive system. In another embodiment, the first drive motor electrically couples to the first traction drive system, and to one or more other traction drive systems. In this manner, it is possible to have a higher voltage system powering two drive motors during high speed, moderate torque operation, rather than have a lower voltage system powering a single drive motor at lower speeds and potentially high torque. This embodiment may allow the first and second energy storage devices to have differing nominal voltage ratings, e.g. 600 volts and 1,200 volts. While differing end-use applications have correspondingly different voltages, voltage needs, current needs, life cycle needs, and circuitry and equipment to support the same, in one embodiment an exemplary higher voltage system may have a variable voltage up to a maximum of about 4000 volts. In alternative non-limiting embodiments, the higher voltage system may be suitable for use of a voltage in a range of from about 200 volts to about 300 volts, from about 300 volts to about 400 volts, from about 400 volts to about 500 volts, from about 500 volts to about 600 volts, from about 600 volts to about 700 volts, from about 700 volts to about 800 volts, from about 800 volts to about 900 volts, from about 900 volts to about 1000 volts, from about 1000 volts to about 1100 volts, from about 1100 volts to about 1200 volts, from about 1200 volts to about 1300 volts, from about 1300 volts to about 1500 volts, from about 1500 volts to about 2000 volts, from about 2000 volts to about 2500 volts, from about 3000 volts to about 3500 volts, from about 3500 volts to about 3750 volts, from about 3750 volts to about 4000 volts, or greater than about 4000 volts.

In a similar manner, a lower voltage system may be in a range of from about 100 volts up to about 3000 volts, depending on the specific energy storage device, and some of the factors described above. In alternative embodiments, the lower voltage system may be suitable for use of a voltage in a range of from about 100 volts to about 200 volts, from about 200 volts to about 300 volts, from about 300 volts to about 400 volts, from about 400 volts to about 500 volts, from about 500 volts to about 600 volts, from about 600 volts to about 700 volts, from about 700 volts to about 800 volts, from about 800 volts to about 900 volts, from about 900 volts to about 1000 volts, from about 1000 volts to about 1100 volts, from about 1100 volts to about 1200 volts, from about 1200 volts to about 2000 volts, from about 2000 volts to about 2500 volts, from about 2500 volts to about 3000 volts, or greater than about 3000 volts. Of note is the difficulty that can be caused by the cascade of changing a single component of an integrated electrical system, making a simple swap-out of parts problematic or outright impossible. For example, it would not be possible to drop in an energy storage device with a 1200 volt rating into a system that was designed to handle 600 volts. From inadequate wiring, insulation, heat management, current and voltage sensors, motors, and controls—each other component of such a system would need consideration as to suitability, and possibly or likely replacement with a different component.

Selection of the electrical configuration provides that the system can propel the vehicle at relatively lower speeds and potentially high torques by using the second traction drive system, and the system can propel the vehicle at relatively higher speeds and moderate torques by using at least the first traction drive system. Particularly, at higher speeds or under heavy load conditions (heavy haul, high speed, or steep grade) energy can be pulled out of the energy storage device to power the second traction drive system in conjunction with the motive power supplied by the first traction drive system.

The first traction drive system operates at a first voltage that is a different voltage than a second voltage at which at least a portion of the second traction system operates. In one embodiment, the first voltage is up to a maximum of about 1,400 volts, and the second voltage is in a range of from about 300 volts to about 600 volts. The second voltage may be selected depending on the ratings of the specific energy storage device. In another embodiment, the traction drive system operates at a first voltage that is a different voltage than a third voltage at which at least a portion of the third traction system operates, the first voltage is up to a maximum of about 1,400 volts, and the third voltage is in a range of from about 600 volts to about 1200 volts. The third voltage may be selected depending on the ratings of the specific energy storage device.

In one embodiment, the first energy storage device has a plurality of components that define a first portion and a second portion. The first portion and the second portion each generate a particular voltage and are electrically connected in parallel. Together, the first portion and the second portion generate the second voltage, which is a lower voltage than the first voltage which the alternator provides. In another embodiment, the first portion and the second portion are electrically connected in serial (series connected), and each of the first portion and the second portion generate the second voltage, which is about the same as the first voltage. Naturally, the addition of electronic switching devices can selectively change the configuration of the first and second portions relative to each other making the serial/parallel connection reversible.

In one embodiment, the first energy storage device has a plurality of components that define a first portion and a second portion. The first portion and the second portion are switchable from a first operating mode in which the first portion and the second portion are electrically connected in parallel, and a second operating mode in which the first portion and the second portion are electrically connected in serial.

The propulsion system can include a temperature control device. The temperature control device includes at least one temperature sensor, at least one temperature control device, and a thaw controller that communicates with the sensor and controls the thermal source to change or maintain the environment inside the common housing.

The first portion and the second portion can be disposed in a common housing. The common housing can operationally associate with the temperature control device. Use of the common housing can leverage insulation and heating and cooling systems, sensors and controls. Also, there is a more uniform heat distribution across the energy storage system. Within the common housing, the energy storage device components (portions) can be connected in serial, in parallel, or switchable serial or parallel.

The first portion and the second portion each may be disposed in a respective first housing and second housing. And, each of the first housing and the second housing may be operationally associated with the temperature control device. Here, the temperature control device may include at least one temperature sensor in each of the first housing and the second housing, at least one thermal source in each of the first housing and the second housing, and a thaw controller that communicates with each sensor and controls each thermal source to change or maintain the environment inside at least a respective one of the first housing and the second housing. The thermal source provides thermal energy to the first energy storage device. The thaw controller can initiate a thaw process to control the thermal source to increase the local environment temperature up to and within an operating temperature range. Further, the thaw controller can initiate a cooling process to control the thermal source to decrease the local environment temperature down to and within an operating temperature range.

Suitable operating temperatures can be greater than about 150 degrees Celsius. In one embodiment, the operating temperature range is in a range of from about 150 degrees Celsius to about 200 degrees Celsius, from about 200 degrees Celsius to about 250 degrees Celsius, from about 250 degrees Celsius to about 300 degrees Celsius, from about 300 degrees Celsius to about 350 degrees Celsius, from about 350 degrees Celsius to about 400 degrees Celsius, or greater than about 400 degrees Celsius. In one embodiment, the operating temperature range is in a range of from about 260 degrees Celsius to about 350 degrees Celsius.

As noted above, the first energy storage device may include a plurality of batteries. And, each of the batteries may include a plurality of cells. Suitable energy storage devices (as energy batteries) may include a metal halide or molten salt battery, lithium technology based battery, sodium sulfur battery, and the like. Where a power battery is used, suitable energy storage devices may include one or more of a lithium ion based battery, a zinc matrix battery, a nickel metal hydride battery, an aluminum battery, a lead acid battery, or a capacitor-based device.

The propulsion system may include an auxiliary electrical system that is electrically connected to the first energy storage device. The auxiliary electrical system can supplement a prime auxiliary electrical system by supplying electrical energy to the prime auxiliary electrical system, especially during periods when regenerative energy is being extracted from the traction drive systems. The auxiliary electrical system can supplement the prime auxiliary electrical system by supplying electrical energy to some subcomponents while the prime auxiliary electrical system supplies electrical energy to other subcomponents. One example is that the auxiliary electrical system can operate critical auxiliary components while the prime auxiliary electrical system is disabled or shutdown to eliminate emissions or reduce petroleum fuel consumption.

In another embodiment, a propulsion system for a vehicle may include a first traction drive system. The first traction drive system can include a heat engine and a first drive motor. The heat engine supplies energy to the first drive motor to propel the vehicle. A second traction drive system can be one propulsion means for supplying energy to a first energy storage device and for receiving energy from the first energy storage device.

Optionally, the means for propulsion is electrically decoupled from the first traction drive system, and is mechanically indirectly coupled to the first traction drive system by regeneratively capturing energy during braking and converting the regeneratively captured energy into electricity to supply electrical energy to the first energy storage device.

A method is provided that includes propelling an electrically driven vehicle at a first, slower speed and potentially high torque by supplying electricity at a first, lower voltage from an energy storage device; and propelling the vehicle at a second, faster speed and moderate torque by supplying electricity at a second, higher voltage from an engine-driven alternator. The method includes charging the energy storage device by converting mechanical energy during a braking mode of operation, or with selected control of at least one of the second or third traction drives or traction drives with associated energy storage system.

Output voltage from the engine driven alternator may be controlled based on vehicle speed, traction torque, and load. Depending on energy storage device and load, propelling an electrically driven vehicle at a first, slower speed and potentially high torque, can be performed using the second electric motor alone, i.e. Electric Vehicle mode (EV), or in combination with the engine-driven alternator to a first electric motor, i.e. Hybrid Electric Vehicle Mode (HEV). Of note is that differing voltages may be implicated by different end uses. Passenger cars and light duty trucks may utilize a voltage of about 200 volts to about 400 volts; medium duty trucks, vans, and busses may utilize a voltage of about 500 to about 650 volts; and locomotives may use voltages of up to about 1400 volts. Because the voltage use may be variable and controlled based on operating conditions and parameters, it is useful to discuss some reasons why the voltage may be affected during use.

Specific and non-limiting examples of some embodiments illustrating aspects of the invention are provide with reference to the Figs. FIG. 1 illustrates a schematic representation of hybrid locomotive 100 shows a first (of the standard four to six) traction drive system 110 coupled to a diesel engine 112 via an alternator 114. A first diode 116 is inline between the alternator and the first traction drive system. The first traction drive system includes a DC/AC inverter 118, and an AC motor 120. A dynamic brake resistor 122 and corresponding controls (not shown) are included in the first traction drive system.

The hybrid locomotive includes a second traction drive system 130. The second traction drive system includes a first energy storage device 132, a DC/AC inverter 134, and an electric drive motor 136. An electrical control device 138 may include a pair of directional diodes, switches and controls as needed. The second traction drive system, in this embodiment, is electrically decoupled from the first traction drive system.

In one embodiment, the hybrid locomotive can optionally include one or more additional traction drive systems. In FIG. 1, only one additional traction drive system is shown, and is referred to as the third traction drive system 140. The third traction drive system includes a second energy storage device 142, a DC/AC inverter 144, and an electric drive motor 146. An electrical control device 148 includes a pair of directional diodes, switches and controls as needed. The third traction drive system, in this embodiment, is electrically decoupled from the first traction drive system and from the second traction drive system. An auxiliary electrical system 154 includes electrical components 156 electrically coupled to the alternator via an AC/AC converter 158.

During operation, the first energy storage device (and any additional energy storage devices present) receive electrical energy, and thus recharge, during regenerative braking events. An additional operating mode allows charging the respective energy storage devices without a regenerative brake event, i.e. by applying a torque command to the second and third traction drives (hybrid) that is opposite polarity to the torque command supplied to the traction drives powered from the diesel engine 112 via the alternator 114. The second and third traction drive systems, in this embodiment, are electrically decoupled from the prime mover diesel engine/alternator. The first traction drive system is mechanically communicative with the second and third traction drive systems via the wheels and the track/road of the vehicle.

Figure 2:
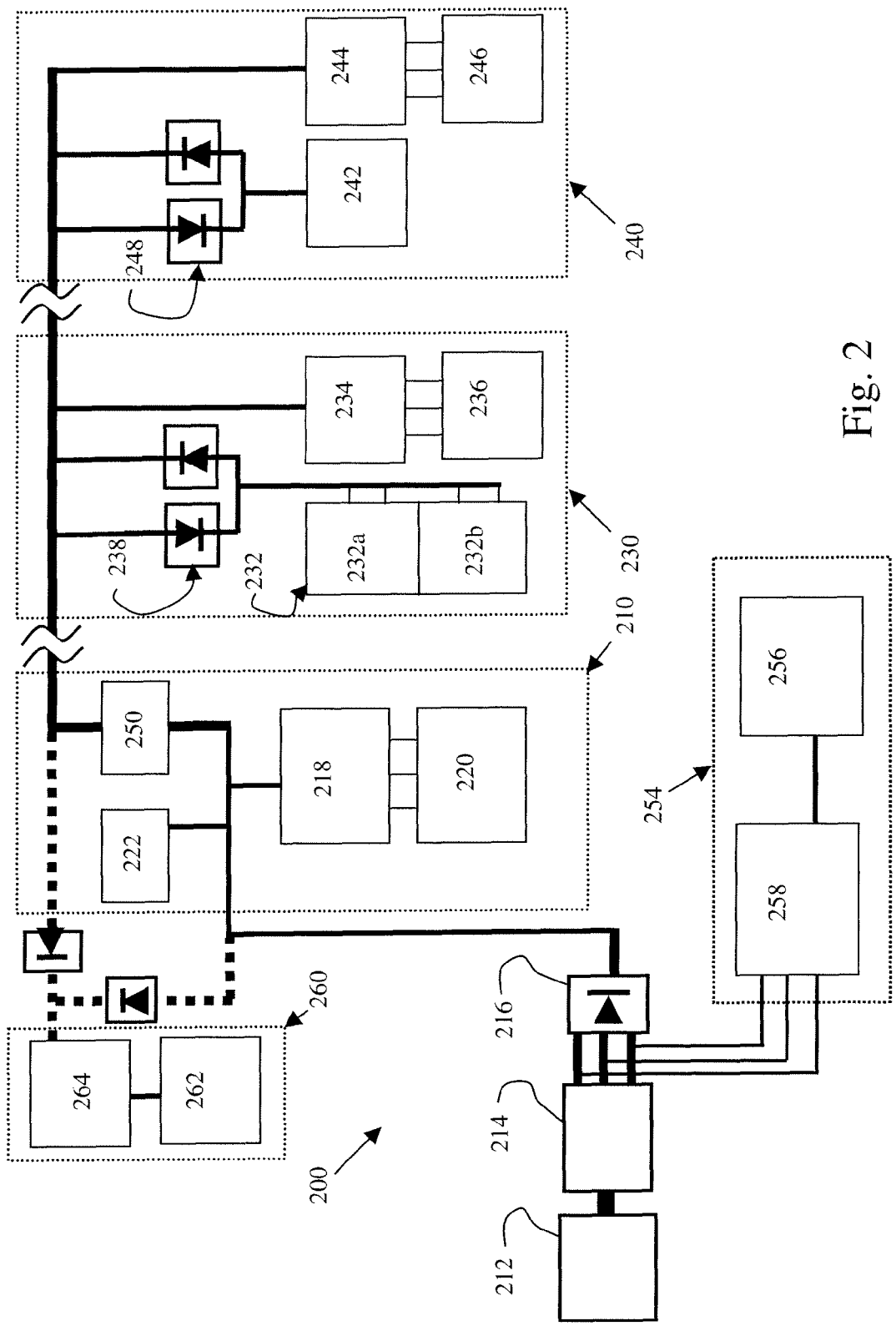
FIG. 2 is a schematic representation of a vehicle comprising another embodiment according to the invention.

With reference to FIG. 2, a schematic representation of hybrid locomotive 200 illustrates a first traction drive system 210 coupled to a diesel engine 212 via an alternator 214. A first diode 216 is inline between the alternator and the first traction drive system. The first traction drive system includes a DC/AC invertor 218, and an AC motor 220. A dynamic brake resistor 222 and corresponding controls (not shown) are included in the first traction drive system.

The hybrid locomotive includes a second traction drive system 230. Alternative propulsion systems, including medium and heavy duty hybrid on and off-Highway truck and stationary drive applications may also include the second traction drive system 230. The second traction drive system includes a first energy storage device 232, a DC/AC inverter 234, and an electric drive motor 236. An electrical control device 238 includes a pair of directional diodes, switches and controls as needed. In this embodiment, the first energy storage device 232 includes a plurality of commonly housed batteries 232a, 232b that operate at a temperature in excess of about 150 degrees Celsius. These commonly housed batteries 232a and 232b may share insulation and temperature control systems for cooling (during use) or for thaw/startup operations. Illustrated is a four terminal system (other embodiments may differ) that allows for fault detection by sensing voltage in each portion of the battery component.

This hybrid locomotive illustrated in the drawing includes one or more additional traction drive systems. An optional additional traction drive system is shown, and is referred to as the third traction drive system 240. The third traction drive system includes a second energy storage device 242, a DC/AC inverter 244, and an electric drive motor 246. An electrical control device 248 includes a pair of directional diodes, switches and controls as needed.

An electrical control device 250 reversibly electrically couples the second traction drive system and the third traction drive system to the first traction drive system. A first auxiliary electrical system 254 includes electrical components 256 electrically coupled to the alternator via an AC/AC converter 258. An optional second auxiliary electrical system 260 includes electrical components 262 electrically coupled to the alternator via a DC/AC converter 264. Alternatively or additionally, the second auxiliary electrical system may be coupled to the alternator and/or main electrical bus. Directional diodes, silicon controlled rectifiers (SCR), thyristors, varistors, and the like may be included where needed. In the illustrated embodiment, diode-type devices are interposed on the lines leading to the second auxiliary electrical system.

During operation, the first energy storage device (and any additional energy storage devices present) may receive electrical energy, and thus recharge, during regenerative braking events, and from electrical energy supplied from the alternator. The second and third traction drive systems, in this embodiment, are electrically decoupled from the prime mover diesel engine/alternator. Further, electricity that is produced by regenerative braking and stored in one or more energy storage devices can be used to power the optional secondary auxiliary system. Suitable uses include those uses that may be convenient to have even when the prime mover is shut down, or the output capacity of the alternator is entirely consumed for motive force. Because the energy storage device may be a high temperature battery, electrical power for a fan to cool the battery, or an air compressor to operate the mechanical brake system may be desirable even when the prime mover is not providing energy.

Figure 3:
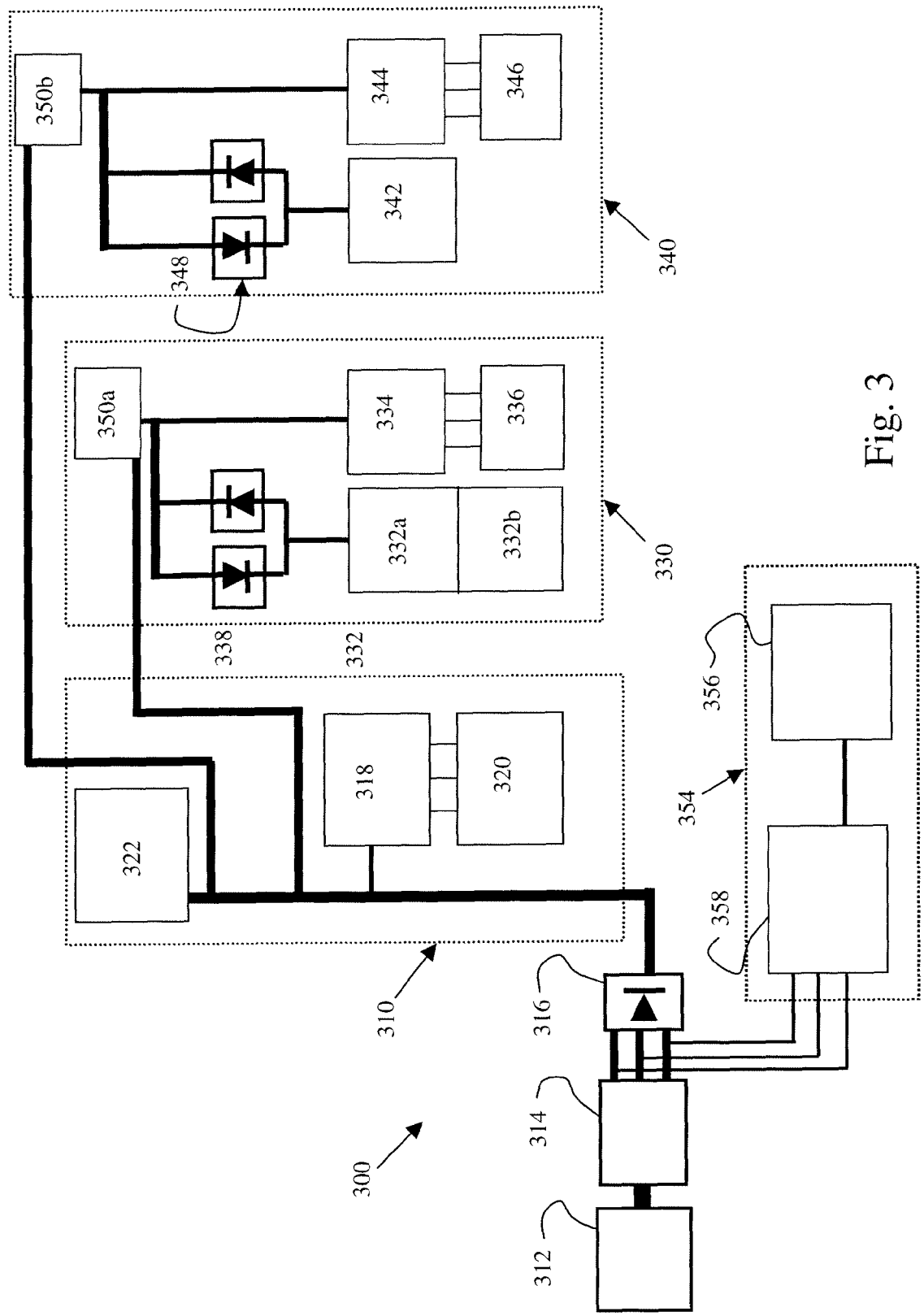
FIG. 3 is a schematic representation of a vehicle comprising another embodiment according to the invention.

With reference to FIG. 3, a schematic representation of hybrid vehicle 300 illustrates a first traction drive system 310 coupled to a diesel engine 312 via an alternator 314. A first diode 316 is inline between the alternator and the first traction drive system. The first traction drive system includes a DC/AC invertor 318, and an AC motor 320. A dynamic brake resistor 322 and corresponding controls (not shown) are included in the first traction drive system.

The hybrid locomotive includes a second traction drive system 330. Alternative propulsion systems, including medium and heavy duty hybrid on and off-Highway truck and stationary drive applications may also include the second traction drive system 330. The second traction drive system includes a first energy storage device 332, a DC/AC inverter 334, and an electric drive motor 336. An electrical control device 338 includes a pair of directional diodes, switches and controls as needed. In this embodiment, the first energy storage device 332 includes a plurality of commonly housed batteries 332a, 332b that operate at a temperature in excess of about 150 degrees Celsius. These commonly housed batteries 332a and 332b may share insulation and temperature control systems for cooling (during use) or for thaw/startup operations. Further, the batteries 332a, 332b may be coupled to a serial/parallel switch (not shown) that allows for low voltage use up the motor corner point, allowing for relatively more torque and lower power use and potentially extending battery life.

This hybrid locomotive illustrated in the drawing includes one or more additional traction drive systems. An optional additional traction drive system is shown, and is referred to as the third traction drive system 340. The third traction drive system includes a second energy storage device 342, a DC/AC inverter 344, and an electric drive motor 346. An electrical control device 348 includes a pair of directional diodes, switches and controls as needed.

A first electrical control device 350a reversibly electrically couples the second traction drive system 330 to the DC Link of the first traction drive system 310, which is electrically coupled to the dynamic brake resistor 322 and to the traction inverter 318. A second electrical control device 350b reversibly electrically couples the second traction drive system 340 to the DC Link of the first traction drive system 310, which is electrically coupled to the dynamic brake resistor 322 and to the traction inverter 318. The dynamic brake resistor 322 of the first traction drive system 310 can be utilized with the at least one of a second traction drive system and a third traction drive system through the corresponding control device 350a, 350 b.

During use, regenerative braking can charge the first and/or second energy storage devices. After full charge, the corresponding electric drive motor can still be made available for dynamic braking effort and the generated electrical energy from such effort can be converted to heat and dissipated.

Embodiments of the invention may provide an economically desirable vehicle by reducing or eliminating the need for an expensive and potential un-reliable DC/DC converter between the energy storage devices and multiple traction drives. Overall vehicle weight may be reduced without a bulky and weighty inductor and DC/DC converter. Thermal gradients may be reduced between the energy storage device sub-units allowing for improve current matching between parallel strings of batteries. Full motive power and dynamic braking power may be available in hybrid mode. In some modes of operation, a greater than full motive power may be available in the hybrid mode when power from the engine/alternator is combined with the energy from the energy storage devices. And, in some embodiments, a full non-hybrid configuration is obtainable by the selection of switching options.

Using the second and/or third (hybrid) traction drive, vehicle operation at low speed and relatively high torque may be obtained, as disclosed hereinabove. Further, operation of the propulsion system in this hybrid mode may improve the efficiency of the inverter (reduced switching losses, e.g.) and the motor by operating at a relatively more proper voltage level. Still other reasons for hybrid operating mode include providing a system power boost, during which, for a short time period, some efficiency may be sacrificed for improved performance.

One embodiment of the invention includes a control method in which the traction motor drives connected to the corresponding energy storage devices may be used at low power first, up to the an optimum power capability. Subsequently, other traction motor drives that are coupled or connected to the alternator are used as time, speed, power requirements, and the like increase. Similarly, the energy storage devices may be charged first during braking by distributing traction torque to traction motor drives connected to the energy storage devices first based on a capability limiting component (e.g., the traction drive, the traction motor, energy storage device). And, when additional demand is placed on the system, traction motor drives that are coupled or connected to the dynamic grid resistors are controlled to produce torque and propel or brake the vehicle. Thereby, the energy storage device charges/discharges preferentially to positively affect the fuel efficiency or emissions for a given load cycle. For example, on a 4400 horsepower (HP) locomotive having an energy storage system capable of supplying 2000 HP, when the demand is less than 2000 HP, only the energy storage device-coupled drives are used. But, when the power demand exceeds 2000 HP to be 3000 HP, then 2000 HP of the demanded 3000 HP may be supplied from the energy storage device, and the difference of 1000 HP may be supplied from the prime mover—for a total of 3000 HP to meet the demand. The amount of power available can be adjusted and/or controlled based on a plurality of factors. Such factors may include, for example, the state of charge of the device, the capability of the traction drive, the efficiency of the energy storage system, the capability of the prime mover, the capacity of the electronics (e.g., invertors and power switches), and the like.

In one embodiment, a system is provided for retrofitting an electrically propelled vehicle. The vehicle may have an engine-driven alternator and at least a first traction motor coupled to the alternator, and a second traction motor. Suitable electrically propelled vehicles may include a locomotive, and a diesel engine may be coupled to the alternator.

The system may include an energy storage device and a control system coupled to the energy storage device. The energy storage device may be coupled to at least the second traction motor. The control system can control a distribution of propulsive power between the first traction motor and the second traction motor. In some upgrade or retrofit kits and systems, the energy storage device may be selected without reference to the components, properties, and requirements of the electrical system of the vehicle as received. That is, the engine-driven alternator may supply voltage at, for example, about 100 volts, but the energy storage device may operate at, for example, 600 volts. And, the kit may be mounted on the vehicle without having to do a redesign or rebuild of the existing vehicle electrical system because the two electrical systems need not be electrically coupled together.

In one aspect, the first traction motor and the second traction motor are part of a plurality of traction motors. Suitable energy storage devices may include those disclosed hereinabove. The control system can control the vehicle so that at relatively lower speeds, at relatively higher torque, or both at relatively higher torque and lower speeds, the first traction motor is used alone. Alternatively, the first traction motor can be used in combination with the second traction motor. Further, the control system can control the vehicle at relatively higher speeds and moderate torque by using the second traction motor, relying more heavily on the energy supplied by the alternator/engine.

In one embodiment, the control system is further operable to initiate a braking event calling for an amount of a required braking power. The first available braking power can be based on a component limiting factor determined by at least one of: power capacity of the first traction motor, electrical uptake capacity of the energy storage device, electrical rating capacity of an electronic inverter, or electrical rating capacity of a power switch. The first available braking power is compared to the required braking power. The required braking power can be first met with the first available braking power. The first available braking power can be supplemented with a second available braking power if the first available braking power is insufficient to meet the required braking power. The second available braking power can be based on at least a capacity of a dynamic braking grid resistor array coupled the second traction motor.

The control system may initiate the first traction motor to propel the vehicle at a first, slower speed and high torque by supplying electricity at a first, lower voltage from the energy storage device to the first traction motor. The control system may then initiate the second traction motor to propel the vehicle at a second, faster speed and moderate torque by supplying electricity at a second, higher voltage from an engine-driven alternator to the second traction motor. The control system may monitor for component failure in the first traction drive system that contains the first traction motor and the energy storage device. The control system can respond to a component failure indication of the first traction drive system by performing one routing energy to and from the first traction motor to a second energy storage device, or routing energy to and from the first energy storage device to the second traction motor. Which response is used is based on which component has failed.

In one embodiment, a kit is provided for retrofitting an engine-propelled vehicle. The vehicle should have at least one propulsive axel coupled to the engine and at least one non-propulsive axel that is not coupled to the engine. The kit should include a traction motor that can to couple to, or replace entirely, the non-propulsive axel of the vehicle. The kit further should include an energy storage device that can couple to the traction motor to define a hybrid axel. The energy storage device, once connected, should supply energy to the traction motor and should receive energy generated by the traction motor. A control system may be included in the kit. The control system can monitor a propulsion demand from an operator of the vehicle and can control the propulsive effort of the propulsive axel and the hybrid axel so that the axel's combined propulsive effort substantially meets the propulsive demand.

Optionally, the control system can meet the propulsive demand by preferentially first using the hybrid axel propulsive effort. Any deficiency in meeting the propulsive demand using the hybrid axel can be made up with the supply of additional propulsive effort using the propulsive axel. And, the kit may include a sensor array to monitor one or more property of the energy storage device, and to communicate information of that one or more property to the control system. The control system can control a distribution of the combined propulsive effort based on the information.

A method is provided that includes propelling an electrically driven vehicle at a first, slower speed and high torque by supplying electricity at a first, lower voltage from an energy storage device to a second electric motor; and propelling the vehicle at a second, faster speed and moderate torque by supplying electricity at a second, higher voltage from an engine-driven alternator to a first electric motor.

In one embodiment, the method may further include charging the energy storage device by converting mechanical energy during a braking mode of operation of the second electric motor to electrical energy. An operating mode may be selected for use in which a greater than full motive power propels the vehicle relative to another operating mode in which power from a prime mover combines with energy supplied from one or more energy storage devices. Alternatively, an operating mode may be selected in which all propulsive power supplied to one or more traction motors is energy supplied from one or more energy storage devices. Another operating mode is provided in which all propulsive power supplied to one traction motor is energy supplied from one or more energy storage devices, and in which all propulsive power supplied to another traction motor is energy supplied from an alternator.

The method may include switching an arrangement of batteries to and from a serial configuration and a parallel configuration based on at least one criteria relating to vehicle speed, vehicle efficiency, vehicle wheel torque, or power requirement. And, the energy storage device may be charged by converting mechanical energy during a braking mode of operation of a third traction drive system and an associated third electric motor to electrical energy. A torque command may be supplied to the first electric motor that is opposite polarity to a torque command supplied to the second electric motor. In this manner, the energy storage device can be charged by the engine/alternator without a direct electrical connection.

Another method according to embodiments of the invention may include initiating a braking event calling for an amount of a required braking power. A first available braking power may be determined based on a component limiting factor determined by at least one of: power capacity of an electric motor, electrical uptake capacity of an energy storage device, electrical rating capacity of an electronic inverter, or electrical rating capacity of a power switch; and comparing the first available braking power to the required braking power. The required braking power may be supplied first with the first available braking power. As needed the first available braking power can be supplemented with a second available braking power. The second available braking power is based on at least a capacity of a dynamic braking grid resistor array coupled thereto. Optionally, the energy storage device can include an energy battery, and a power battery that has a relatively faster uptake of energy than the energy storage battery. The regeneratively captured energy can be routed to the power device with or without routing to the energy battery. From there, the energy can be fed from the power battery to the energy battery at a rate of uptake that the energy battery can handle.

In one embodiment, an electrical activity monitor may be coupled to the energy storage device. The electrical activity monitor can lock out access to electrical components having an electrical charge that is sufficiently high to injure a person in contact therewith. The electrical activity monitor can indicate that the electrical components are electrically active to a person proximate thereto. Or, the electrical activity monitor can to perform a plurality of safety-related tasks, such as the lock out and the electrical activity indication.

While examples were given with some reference to locomotives, the propulsion system may be useful in other vehicle types. Other suitable vehicles may include passenger vehicles; medium or light duty vans and trucks; busses and heavy duty trucks and construction equipment; off-highway vehicles (OHV); and boats, ships and submarines.

The embodiments described herein are examples of compositions, structures, systems and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A method, comprising:
propelling an electrically driven vehicle at a first, slower speed and high torque by supplying electricity at a first, lower voltage from a first energy storage device to a second electric motor; and
propelling the vehicle at a second, faster speed and moderate torque by supplying electricity at a second, higher voltage from an engine-driven generator to a first electric motor, wherein the first electric motor is not coupled to the first energy storage device.

2. The method as defined in claim 1, further comprising charging the energy storage device by converting mechanical energy during a braking mode of operation of the second electric motor to electrical energy.

3. The method as defined in claim 1, further comprising selecting from a plurality of modes of operation an operating mode in which a greater than full motive power propels the vehicle relative to another operating mode in which power from a prime mover combines with energy supplied from one or more energy storage devices that include the first energy storage device.

4. The method as defined in claim 1, further comprising selecting from a plurality of modes of operation an operating mode in which all propulsive power supplied to one or more traction motors is energy supplied from one or more energy storage devices that include the first energy storage device.

5. The method as defined in claim 1, further comprising selecting from a plurality of modes of operation an operating mode in which all propulsive power supplied to one traction motor is energy supplied from one or more energy storage devices that include the first energy storage device, and in which all propulsive power supplied to another traction motor is energy supplied from the engine-driven generator.

6. The method as defined in claim 1, further comprising switching an arrangement of batteries to and from a serial configuration and a parallel configuration based on at least one criteria relating to vehicle speed, vehicle efficiency, vehicle wheel torque, or power requirement.

7. The method as defined in claim 1, further comprising charging the first energy storage device by converting mechanical energy during a braking mode of operation of a third traction drive system and an associated third electric motor to electrical energy.

8. The method as defined in claim 1, further comprising applying a torque command to the first electric motor that is opposite polarity to a torque command supplied to the second electric motor.

9. The method as defined in claim 8, further comprising charging the energy storage device.

10. A method, comprising:
propelling an electrically driven vehicle by supplying electricity from an engine-driven generator to a first electric motor; and
generating electricity at a second electric motor to charge an energy storage device without regenerative braking by applying a torque command to the first electric motor that is opposite polarity to a torque command supplied to the second electric motor.

11. The method as defined in claim 10, wherein the propelling and generating occur simultaneously.

12. The method as defined in claim 10, wherein the propelling and generating occur sequentially, and in which the propelling provides momentum to the vehicle prior to the generating electricity.

13. A method, comprising:
monitoring for component failure in a second traction drive system in a vehicle having at least a first traction drive system and the second traction drive system, wherein the first traction drive system comprises a first electric motor and the second traction drive system comprises a second electric motor coupled to a first energy storage device; and
responding to a component failure indication of the first traction drive system by:
routing energy to and from the first electric motor to a second energy storage device, or
routing energy to and from the first energy storage device to the second electric motor.

14. The method as defined in claim 13, wherein the failure indication indicates the first energy storage device, and further comprising electrically isolating at least one battery disposed in the first energy storage device.

15. The method as defined in claim 13, wherein responding to the component failure indication comprises selecting a response based on a nature of the component failure and on a type of component that failed.

16. A method, comprising:
initiating a braking event calling for an amount of a required braking power for a vehicle having an electric motor that can drive a wheel, and having an energy storage device, an electric converter, and a power switch coupled to the electric motor;
determining a first available braking power based on a component limiting factor determined by at least one of:
power capacity of the electric motor,
torque capacity of the electric motor,
maximum adhesion limit of the wheel on a wheel-bearing surface,
electrical uptake capacity of the energy storage device,
electrical rating capacity of the electronic converter, or
electrical rating capacity of the power switch; and
comparing the first available braking power to the required braking power;
meeting the required braking power first with the first available braking power; and
supplementing the first available braking power with a second available braking power where the first available braking power is insufficient to meet the required braking power, and the second available braking power is based on at least a capacity of a dynamic braking grid resistor array coupled thereto.

17. The method as defined in claim 16, wherein the energy storage device is a power battery, and further comprising routing energy from the energy storage device to a second energy storage device comprising an energy battery at a rate of electrical uptake that is based on the energy battery.

18. The method as defined in claim 16, wherein the energy storage device comprises both a power battery and an energy battery, further comprising determining an electrical uptake capacity based on a combination of electrical uptake capacity of both the energy battery and the power battery.

19. The method as defined in claim 16, further comprising recharging the energy storage device preferentially over the supplementing the first available braking power.

20. A system, comprising:
means for propelling an electrically driven vehicle at a first, slower speed and high torque by supplying electricity at a first, lower voltage from a first energy storage device to a second electric motor; and means for propelling the vehicle at a second, faster speed and moderate torque by supplying electricity at a second, higher voltage from an engine-driven generator to a first electric motor, wherein the first electric motor is not coupled to the first energy storage device.

21. A system, comprising:

means for propelling an electrically driven vehicle by supplying electricity from an engine-driven generator to a first electric motor; and means for generating electricity at a second electric motor to charge an energy storage device without regenerative braking by applying a torque command to the first electric motor that is opposite polarity to a torque command supplied to the second electric motor.

22. A system, comprising:

means for initiating a braking event calling for an amount of a required braking power for a vehicle having an electric motor that can drive a wheel, and having an energy storage device, an electric converter, and a power switch coupled to the electric motor;

means for determining a first available braking power based on a component limiting factor determined by at least one of:
- power capacity of the electric motor,
- torque capacity of the electric motor,
- maximum adhesion limit of the wheel on a wheel-bearing surface,
- electrical uptake capacity of the energy storage device,
- electrical rating capacity of the electronic converter, or
- electrical rating capacity of the power switch; and means for comparing the first available braking power to the required braking power;

means for meeting the required braking power first with the first available braking power; and means for supplementing the first available braking power with a second available braking power where the first available braking power is insufficient to meet the required braking power, and the second available braking power is based on at least a capacity of a dynamic braking grid resistor array coupled thereto.

* * * * *